US008910491B2

(12) United States Patent
Iovanel

(10) Patent No.: US 8,910,491 B2
(45) Date of Patent: Dec. 16, 2014

(54) MODULAR CHILLER SYSTEM AND METHOD FOR RETROFIT

(76) Inventor: Flavian Iovanel, Plainville, MA (US)

( * ) Notice: Subject to any disclaimer, the term of this patent is extended or adjusted under 35 U.S.C. 154(b) by 616 days.

(21) Appl. No.: 13/068,683

(22) Filed: May 17, 2011

(65) Prior Publication Data

US 2012/0291466 A1    Nov. 22, 2012

(51) Int. Cl.
| | | |
|---|---|---|
| F25D 23/00 | (2006.01) | |
| F25D 3/08 | (2006.01) | |
| F25B 1/10 | (2006.01) | |
| F25D 17/00 | (2006.01) | |
| F25D 17/06 | (2006.01) | |

(52) U.S. Cl.
CPC ... *F25D 3/08* (2013.01); *F25B 1/10* (2013.01); *F25D 17/005* (2013.01); *F25D 17/067* (2013.01); *F25D 2400/28* (2013.01); *F25D 2400/30* (2013.01); *F25D 2700/16* (2013.01)
USPC .................. 62/259.4; 62/62; 62/407; 62/413

(58) Field of Classification Search
USPC .......... 62/62, 132, 259.4, 337, 407, 413, 428, 62/429; 454/234, 241
See application file for complete search history.

(56) References Cited

U.S. PATENT DOCUMENTS

| | | | | |
|---|---|---|---|---|
| 5,577,958 A | * | 11/1996 | Kumekawa et al. | 454/233 |
| 5,826,432 A | | 10/1998 | Ledbetter | |
| 6,213,867 B1 | * | 4/2001 | Yazici et al. | 454/263 |
| 6,321,830 B1 | * | 11/2001 | Steinmann | 165/41 |
| 6,551,185 B1 | * | 4/2003 | Miyake et al. | 454/234 |
| 6,769,477 B2 | * | 8/2004 | Hakkinen et al. | 165/123 |
| 6,819,564 B2 | * | 11/2004 | Chung et al. | 361/697 |
| 7,178,356 B1 | | 2/2007 | Lingelbach et al. | |
| 7,497,250 B2 | * | 3/2009 | Coy et al. | 165/122 |
| 8,715,047 B2 | * | 5/2014 | Kim | 454/254 |
| 2008/0245078 A1 | | 10/2008 | Burn | |

FOREIGN PATENT DOCUMENTS

GB      2186357 A  *  8/1987

* cited by examiner

*Primary Examiner* — Jonathan Bradford

(57) ABSTRACT

A Modular Chiller System integrated into a single Standalone Rack Assembly having vertically positioned air intakes, heat exchanger, and an air deflector is disclosed. The orientation of the components in the Standalone Rack Assembly allows for maximum heat exchange from a rack of hot food items positioned coextensively to the Chiller System. Hot air from the food rack is received through the air intakes into the heat exchanger where chilled air is recirculated outward through said frame assembly. The Chiller System is portable and can be retrofitted to existing walk-in cooler configurations, or be embodied in standalone and portable refrigeration enclosures.

15 Claims, 19 Drawing Sheets

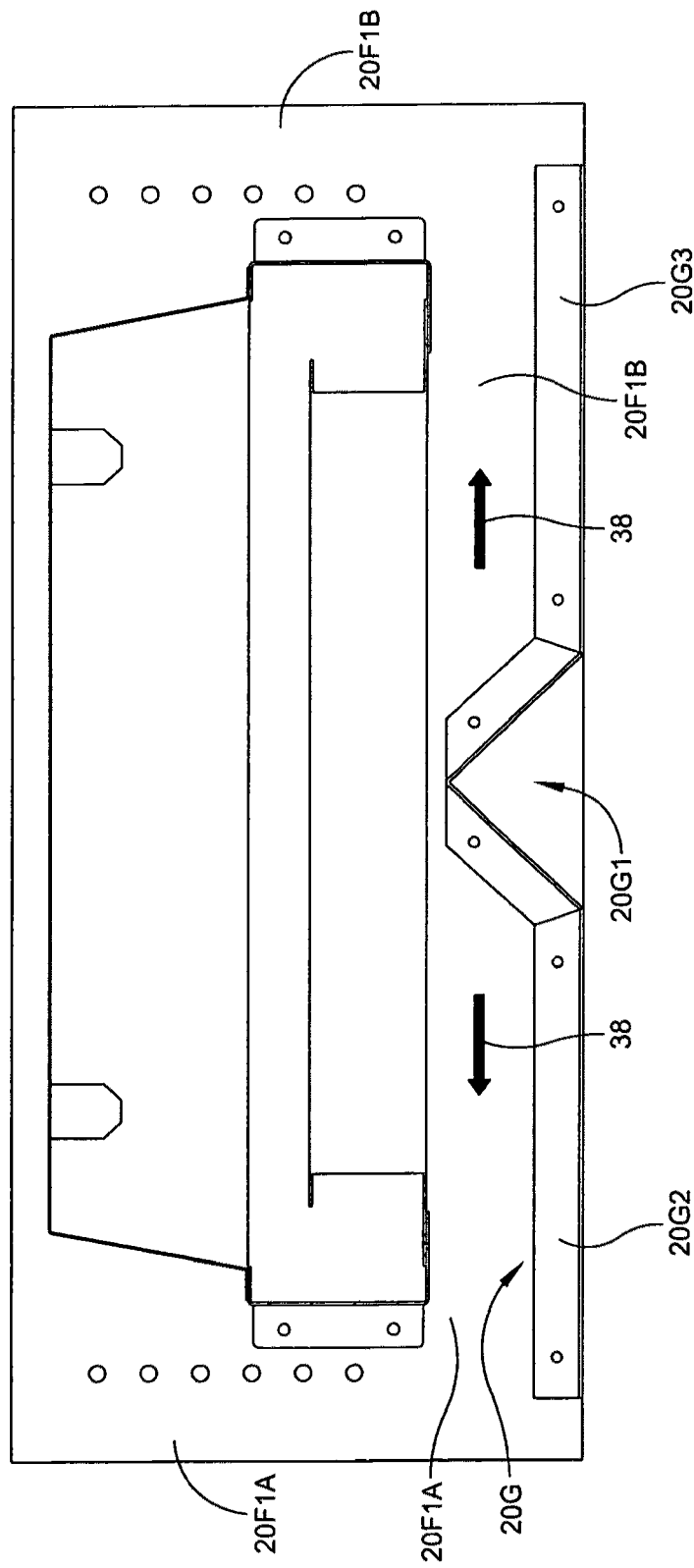

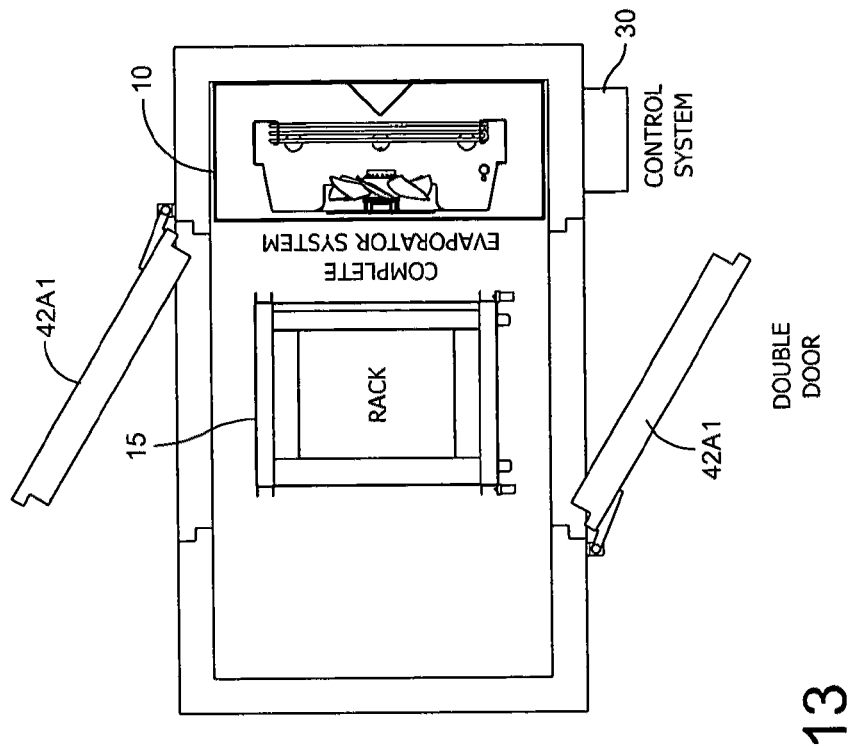
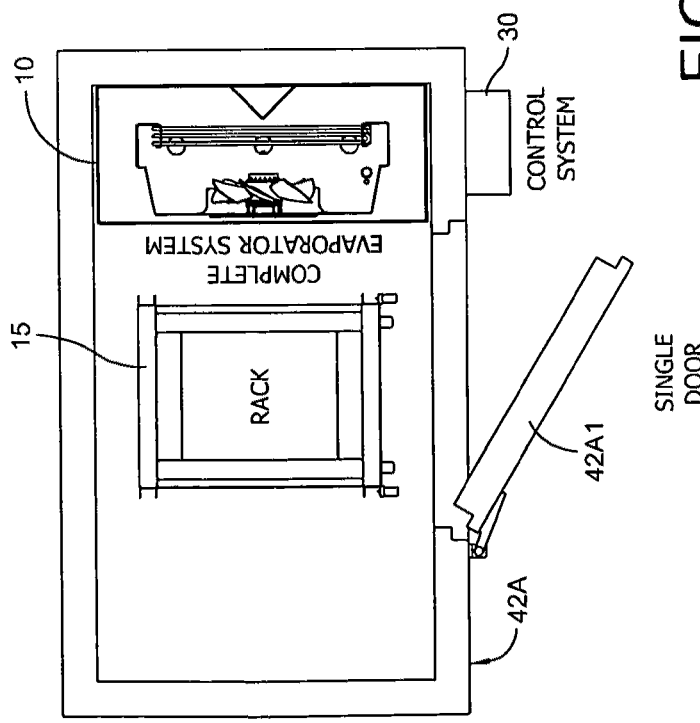
FIG. 13

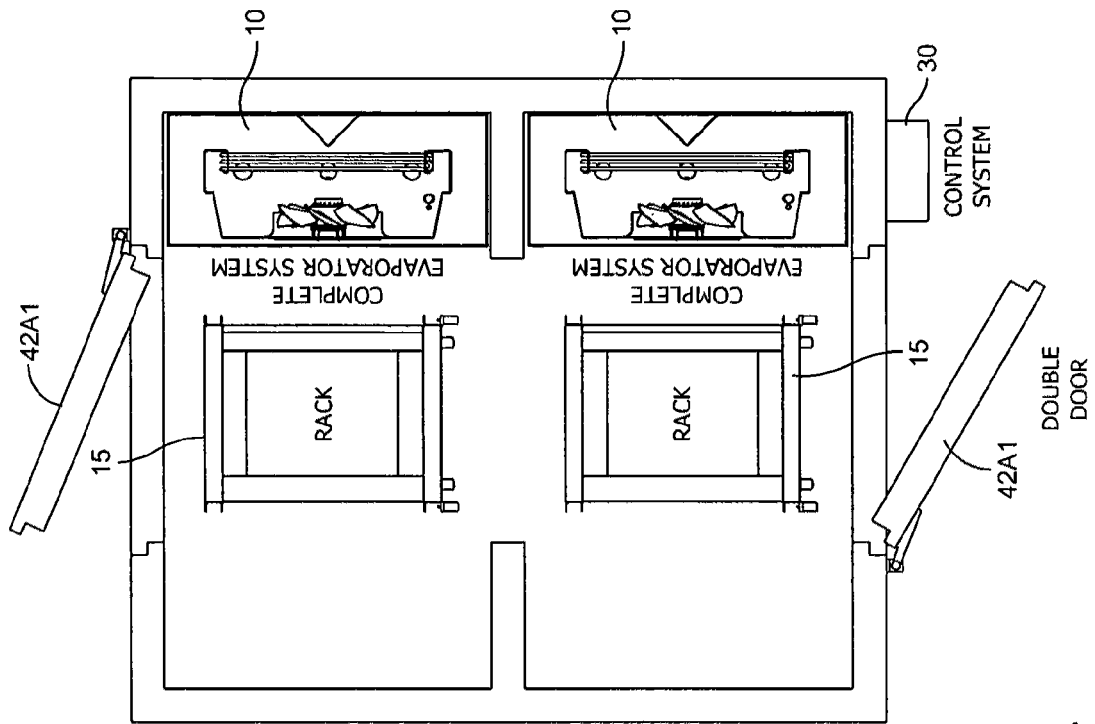
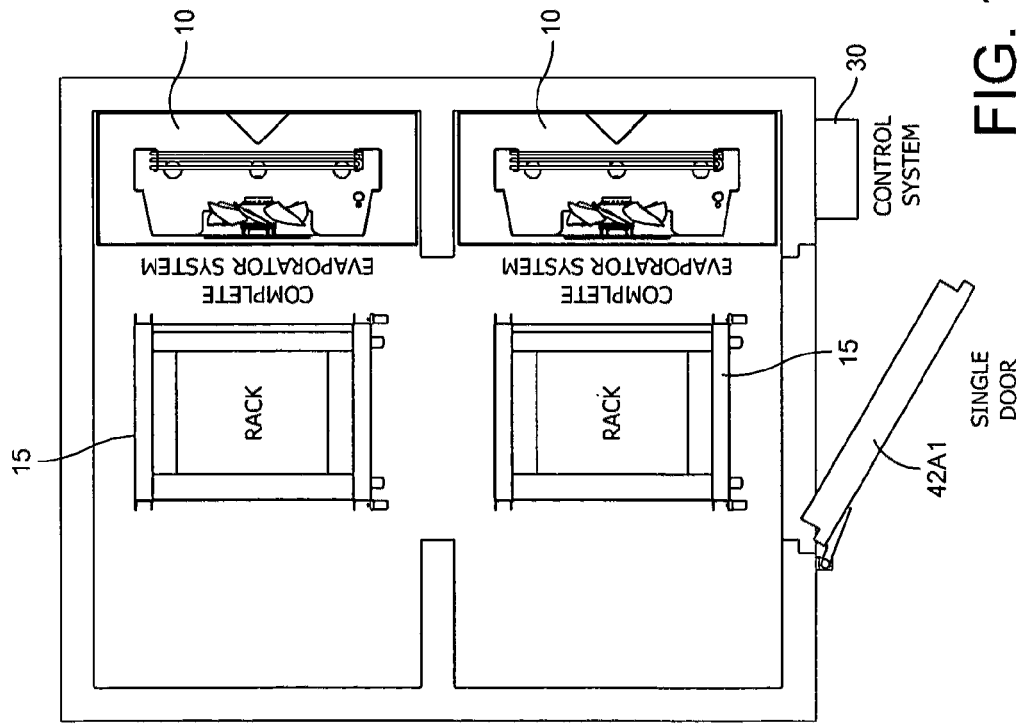
FIG. 14

MODULAR CHILLER SYSTEM AND METHOD FOR RETROFIT

FIELD OF THE INVENTION

The present invention relates generally to an apparatus for the rapid chilling of food products and a method for seamless retrofitting of the apparatus to existing walk-in cooler arrangements.

BACKGROUND OF THE INVENTION

Increased regulation in the food service industry has forced kitchens to meet new HACCP (Hazard Analysis and Critical Control Point) requirements regarding the rapid cooling of prepared foods for storage by large scale food service operations. Such operations include, for example, commissaries, hospitals, schools, prisons and correctional institutions, airport in-flight kitchens, convention centers, hotel banquets, cruise ships, and business cafeterias, to name a few. The term "cook-chill" is often used to describe a process of cooking or preparing food (usually in large volume) and then chilling it for refrigerated storage, to be reheated and served at a later time, typically within a few days.

Efficient and rapid cooling of food generally prolongs storage life and therefore minimizes cooking and food preparation activities. This enables food preparation to be performed with a smaller staff and at convenient times, rather than requiring lengthy preparation before every mealtime. By employing a cook-chill process, large volumes of food can be prepared by skilled chefs and kitchen staff working ordinary day shifts, and the food can be readily available for night shift or weekend meals by simple reheating.

Rapid chilling is needed to prevent irreversible deterioration of prepared foods. When left at the warm "danger zone" (temperatures usually in the range of 45.degree. to 140.degree.), cooked food deteriorates quickly due to the action of organisms and enzymic and chemical reactions. A reduction in the storage temperature slows the exponential multiplication of bacteria and other microorganisms and also slows the chemical and enzymic reactions. At normal refrigeration temperatures reactions and bacteria growth still take place, but at a much slower rate.

Rapid chilling of cooked food maximizes shelf life without sacrificing its quality and physical appearance. Existing food safety guidelines require that certain hot food products be chilled from cooking temperatures of 140.degree. F. to 40.degree. F. in a specific period of time, typically about 90 minutes. A standard refrigerated room or storage refrigerator/freezer is designed for storage of food products, and is incapable of lowering the food product's initial temperature with sufficient rapidity to ensure against bacterial growth and chemical reactions.

All commercial kitchens have one or more cold storage units including a walk-in cooler or a walk-in freezer or a combination of both. However, space limitations often limit the options for location of rapid chilling devices. Stand alone rapid chiller systems are often too large and sacrifices must be made of the size of the chilling system for installation in a limited space.

It is therefore needed a Modular Chiller System that can be retrofitted to an existing cooler configuration through a seamless modular integration.

It is further needed a standalone modular chiller system, more portable, and independent of the larger refrigeration system.

SUMMARY OF THE INVENTION

The present invention, in one aspect, relates to a rapid chiller device, or "blast-chiller", having separate novel components that are integrated into a Modular Chiller System when retrofitted to and existing walk-in cooler or refrigeration space. In this embodiment the Modular Chiller System is a separate section of an existing larger walk-in cooler or refrigerator. The system may also operate as a standalone system, existing independent of a larger refrigeration system.

The method of integrating the Modular Chiller System into an existing walk-in cooler comprises the steps of 1.) selecting a portion of an existing walk-in cooler, 2.) installing walls and doors, by means known in the art, to define an existing Blast Chiller space within the cooler 3.) positioning a frame assembly of refrigeration and electrical components on one of the interior walls, 4.) positioning a controller unit on an exterior wall and interfacing the controller unit to the frame assembly, and 5.) positioning a remote condenser unit and interfacing the condenser unit to the frame assembly.

BRIEF DESCRIPTION OF THE DRAWINGS

The invention is best understood from the following detailed description when read in connection with the accompanying drawings, which illustrate various embodiments of the present invention:

FIG. 3A illustrates a cross-section of frame assembly 20F.

FIG. 13 illustrates two standalone Blast Chiller freezer enclosures with either a single or double entry, and retrofitted with the Modular Chiller system and control panel of the present invention.

FIG. 14 illustrates an alternative embodiment of two standalone Blast Chiller freezer enclosures each fitted with multiple Modular Chillers and Control Panels.

DETAILED DESCRIPTION OF THE INVENTION

Figure 1:
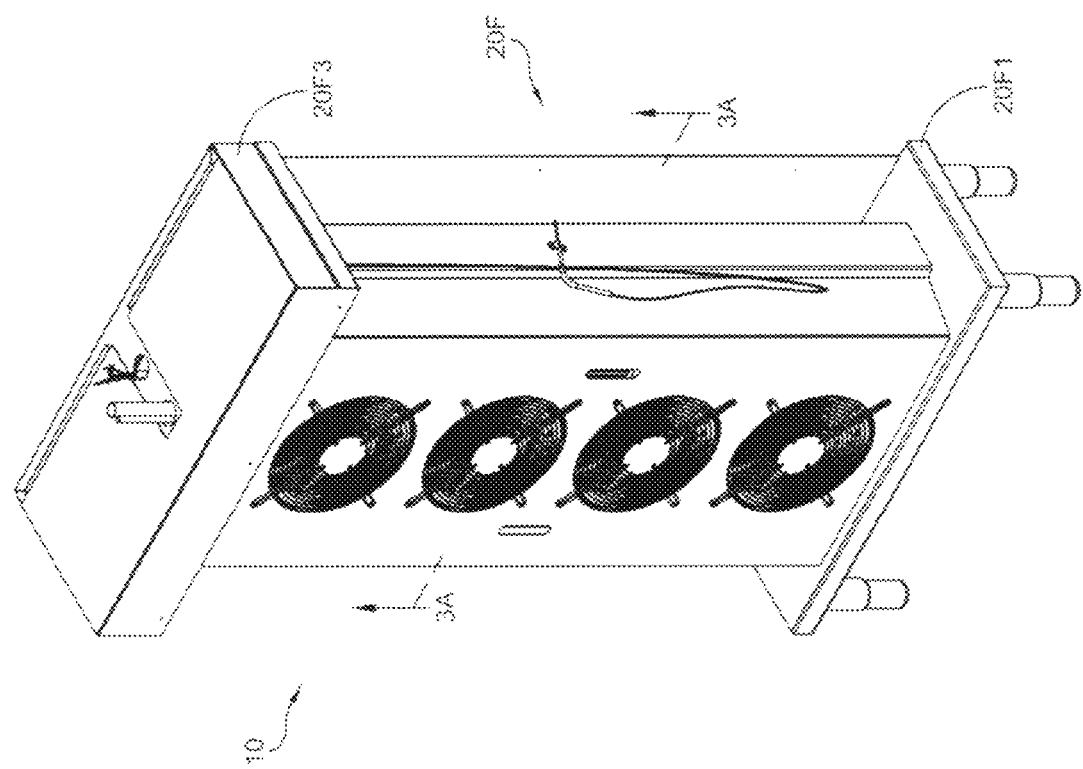
FIG. 1 illustrates a Modular Chiller frame assembly of the present invention.
Figure 2:
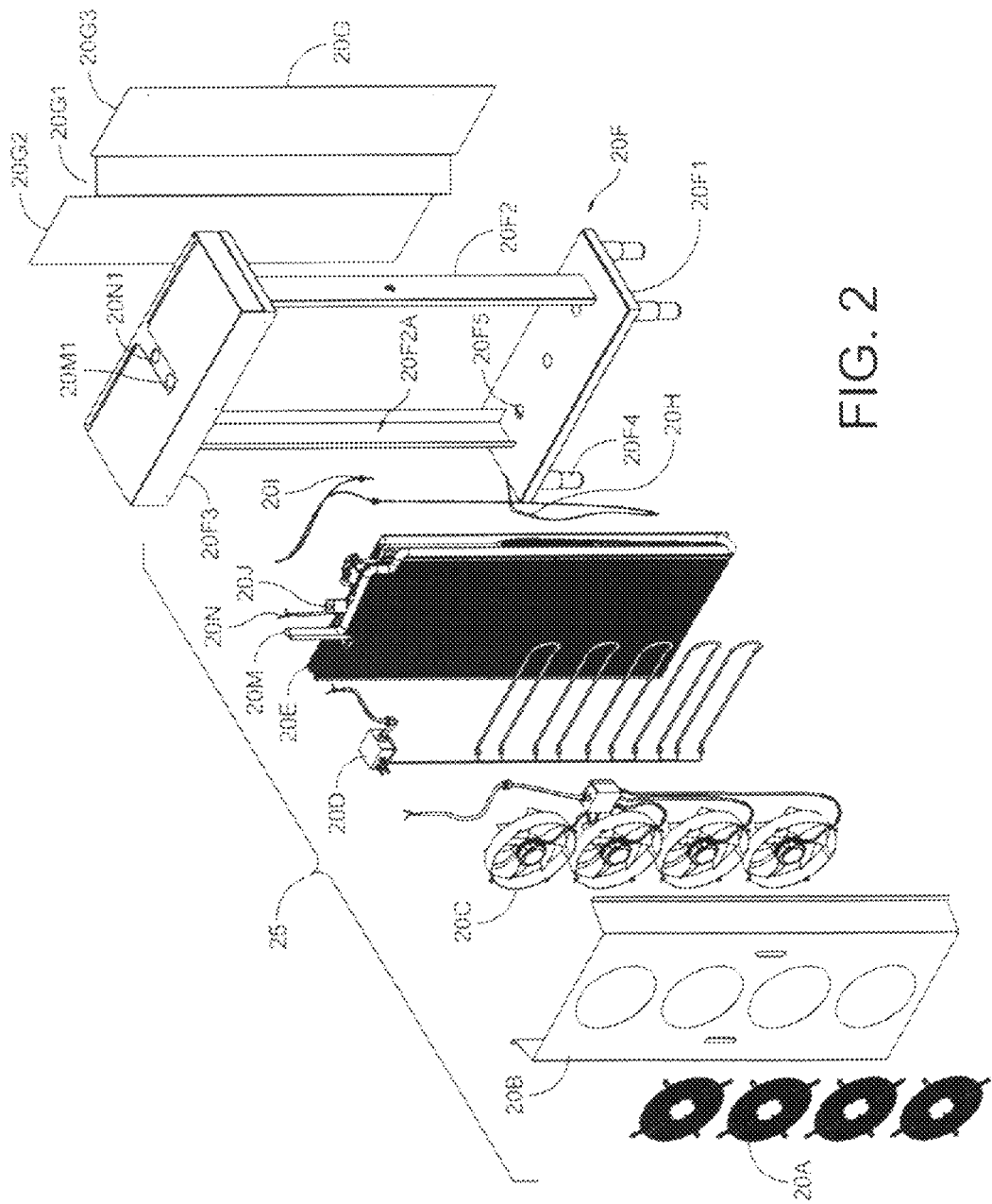
FIG. 2 illustrates an exploded view of the Modular Chiller frame assembly of FIG. 1.

FIG. 1 illustrates an embodiment of the Modular Chiller frame assembly 10 employing the principles of the present invention and having components as illustrated in FIG. 2. The assembly 10 includes a frame 20F having a base panel 20F1, side supports 20F2 extending upward from base panel 20F1 at one end, and a top panel 20F3 attached to side supports 20F2 at the opposite end, base panel 20F1 and top panel 20F3 being substantially parallel to each other. Base panel 20F1, side supports 20F2, and top panel 20F3 being in fixed relation to each other forming the frame 20F.

Base panel 20F1 may include legs 20F4 for separation of frame assembly 10 from the floor surface. Legs 20F4 can be height adjustable and the frame assembly 10 fabricated from stainless steel 304 or its equivalent. Base panel 20F1 may also include a plurality of drainage holes 20F5 to channel condensation from evaporator assembly 20E. A drain pan (not shown) may be either integrated into base. panel 20F1 or be free standing in a location that would allow moisture through the drainage holes to enter the pan, and exit the pan via a drain connection to an outside location (not shown).

Figure 3:
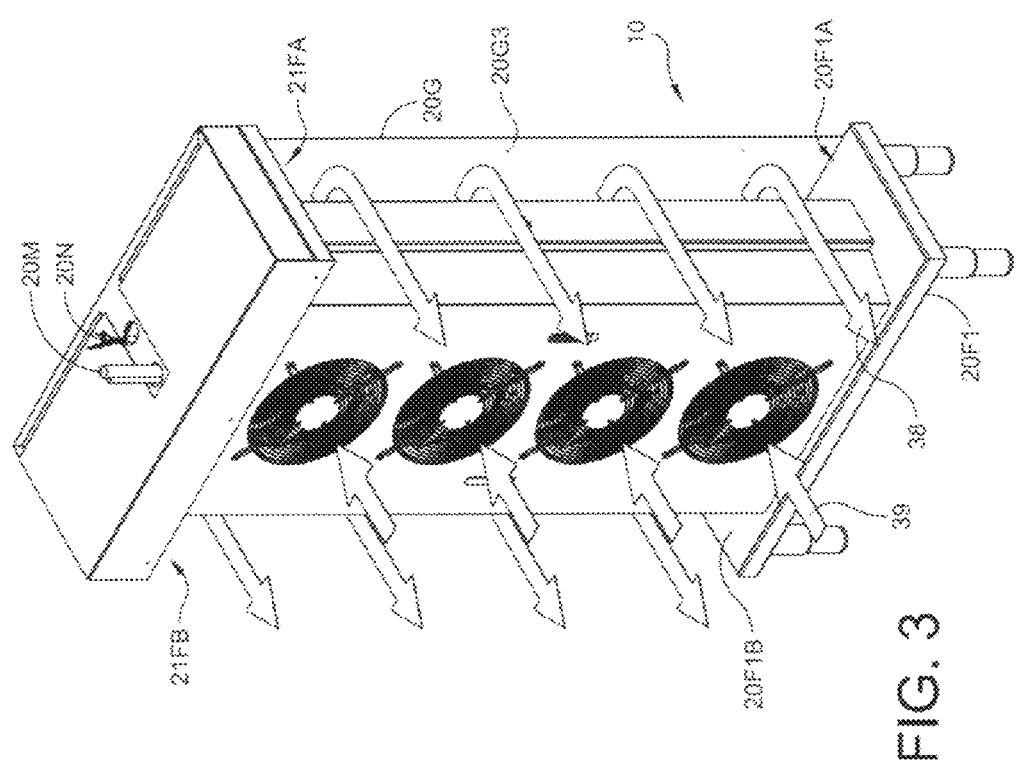
FIG. 3 illustrates the airflow direction (indicated by arrows) of an operable Modular Chiller frame assembly as embodied in FIG. 1.

Side support 20F2, may include channels 20F2A for fixing the Modular Chiller system components 25 within the frame 20F. Means known in the art, such as screwing, riveting, bolting may be used for attaching components to frame 20F. Defrost Heaters 20D are attached to the evaporator assembly 20E by any means known in the art, for example, hooks or clips. Frame assembly 20F, further includes an air deflector 20G mounted at the rear of frame 20F as illustrated in FIGS. 2, 3 and 3A. Deflector 20G includes diffusion panels 20G2 and 20G3 and center section 20G1. Center section 20G1 separates outgoing cold air 38 produced by Modular Chiller System components 25 and transfers the cold air 38 over diffuser panels 20 G2 and 20G3.

As illustrated in FIGS. 3 and 3A, outgoing air 38 is further channeled by moving over surface 20F1A and identical surface 20F1B. Air deflector, 20G, in the preferred embodiment, sits on and is secured to base panel 20 F1 (FIG. 3A), and top panel 20F3 (not shown) in an identical manner, with the surface of deflectors 20G2 and 20G3 set off from and substantially parallel to the rear surface of evaporator 20E.

Deflector sections 20G2 and 20G3, at their first and second ends, in the preferred embodiment are secured to the edge of panels 20F1 and 20F3 and are displaced from the rear of evaporator 20E. Sections 20G2 and 20G3 terminate into opposite ends of center section 20G1 which angles inward into close proximity to the rear of evaporator 20E.

Top panel 20 F3 further includes cutouts 20M1 and 20N1 for the passage of refrigeration line 20M (liquid and gas lines) and electrical lines 20N. In the preferred embodiment, modular chiller frame assembly 10, and all internal components are mounted vertically to achieve a narrow frame base footprint and to produce a consistent air flow and heat transfer at every level of a food rack 15 placed in front of modular chiller frame assembly 10 (FIG. 3, 12).

Figure 12:
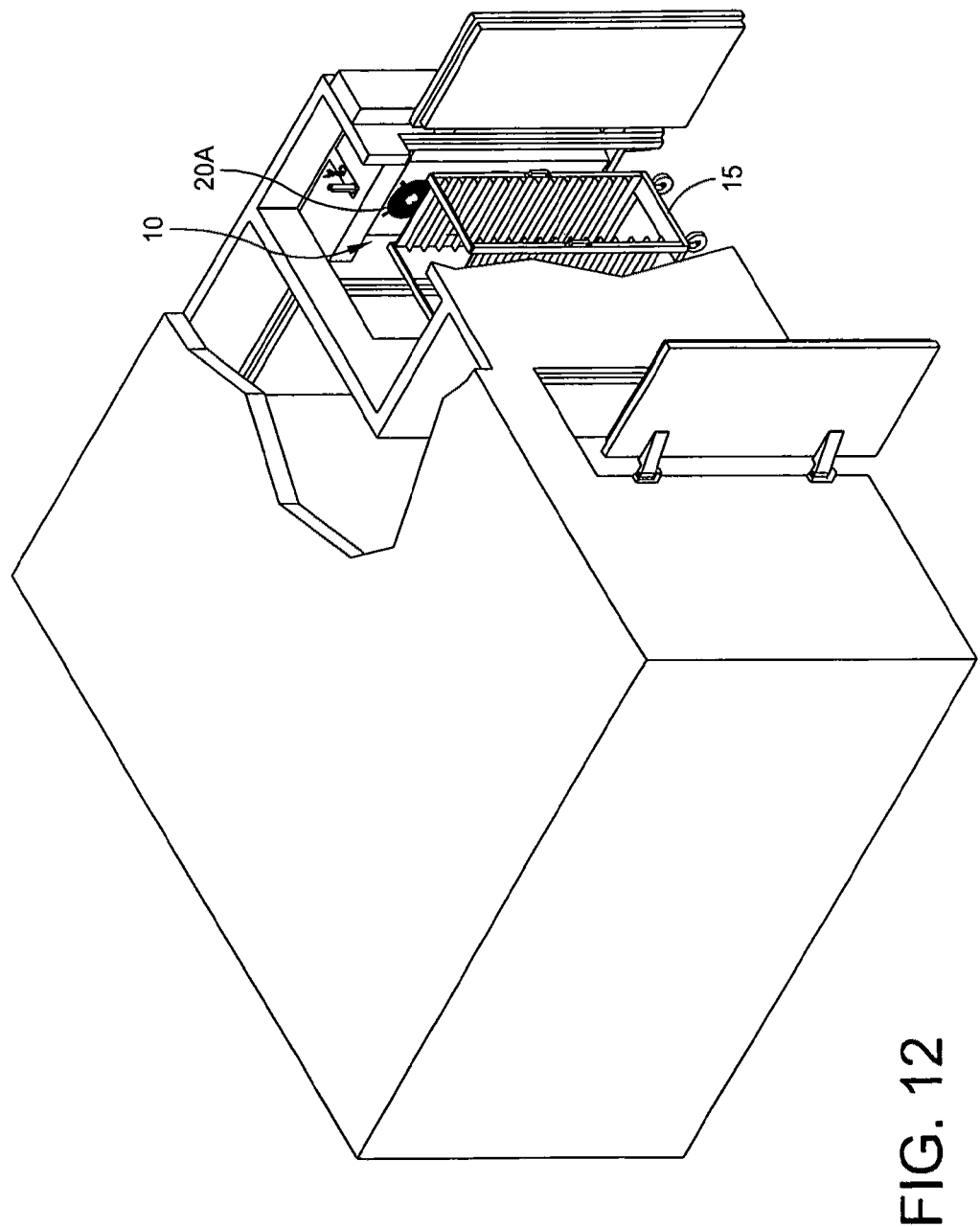
FIG. 12 illustrates a cut-away view of the Blast Chiller freezer enclosure of FIG. 10.

As illustrated in FIGS. 3 and 12, fans 20C pull hot air 39 from every level of rack 15 into chiller system components 25, then cold air 38 is dispersed evenly and consistently throughout the refrigeration enclosure reaching the multiple levels of rack 15. The channeling of cold air 38 is achieved over diffuser panels 20G2 and 20G3 and surfaces 20F1A and 20F1B.

FIG. 13 illustrates a standalone version of the Modular Chiller assembly 10 integrated into a refrigeration space having an enclosure 42A. It is understood that the enclosure can be any dimension, including a non-walking enclosure having drawers or racks accessible therein. Further, subject invention contemplates the placement of chiller assembly 10 and control system 30 in locations deemed suitable by those skilled in the art. For example, chiller assembly 10 may be mounted off the floor directly to a sidewall of en enclosure 42A. Further, control system 30 could be integrated within the enclosure 42A for a "Flush" appearance.

The Modular Chiller System assembly 10 includes chiller system components 25 (heat exchanger), known in the art, for the removal of warm air 39 and conversion to cold air 38. These components include, but are not limited to, evaporator fans 20C, defrost heater 20D, evaporator 20E, fan grilles 20A, and condensing unit 50. In the preferred embodiment, the condensing unit will be mounted outside of the refrigeration building. Hot air from the food placed in rack 15 is sucked through fans 20C (intake) and transfers its thermal energy to evaporator 20E (see FIG. 12 for placement of rack 15).

The evaporator 20E may circulate any suitable coolant such as, e.g., chlorofluorocarbon freon (also known as 404A). Circulating coolant evaporates due to the transfer of thermal energy from air heated by the hot food in rack 15 to the evaporator 20E. The evaporated coolant circulates through the external condensing unit 50, wherein it condenses and transfers its thermal energy. It is contemplated that the dimensions of the Modular Chiller Assembly 10, can be modified to accommodate various sized refrigeration spaces, including portable refrigeration units, without departing from the spirit and scope of the invention.

Figure 7:
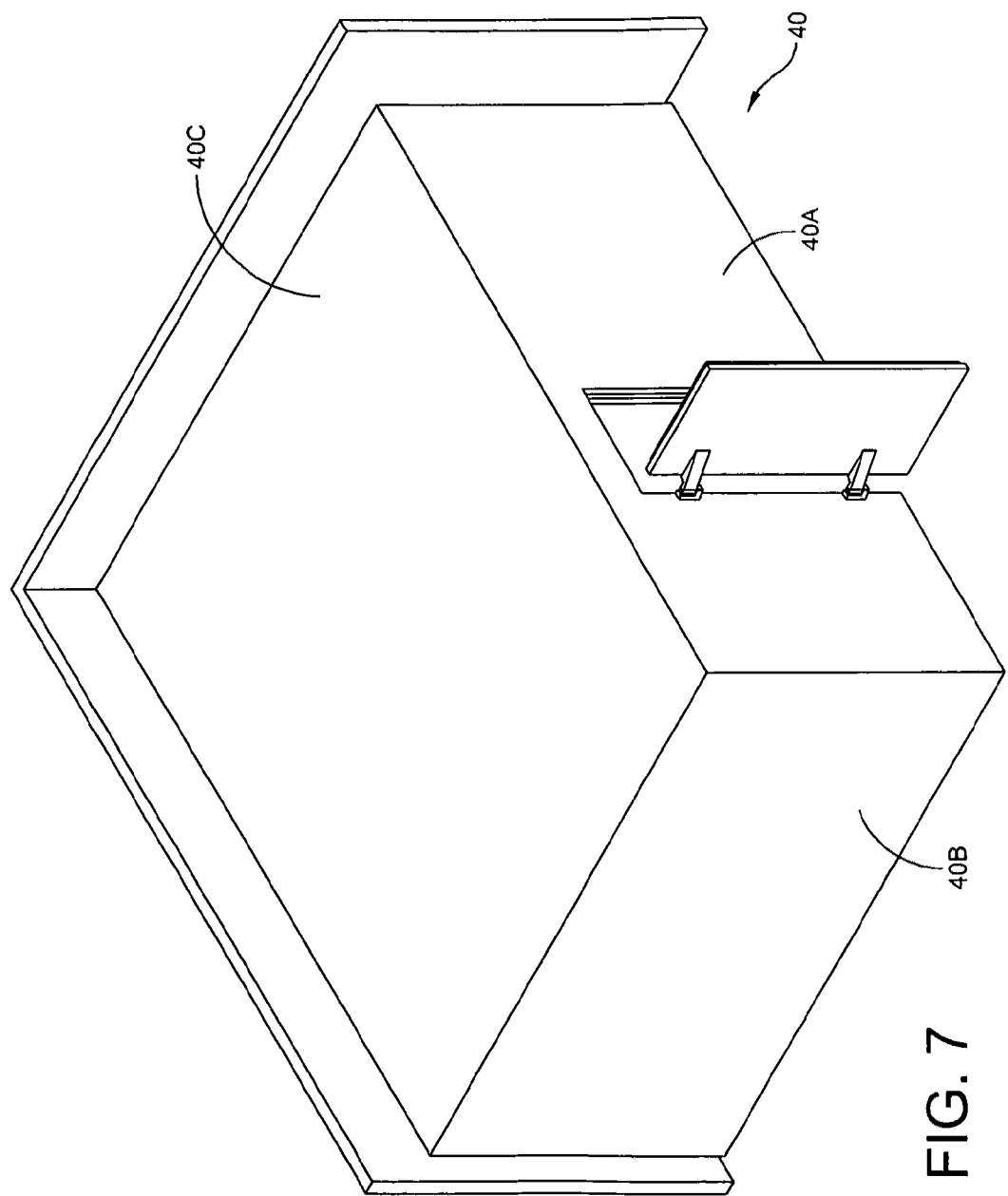
FIG. 7 illustrates and existing refrigerated room of which the Modular Chiller frame assembly of FIG. 1 and Control Panel of FIG. 4 are retrofitted into.
Figure 8:
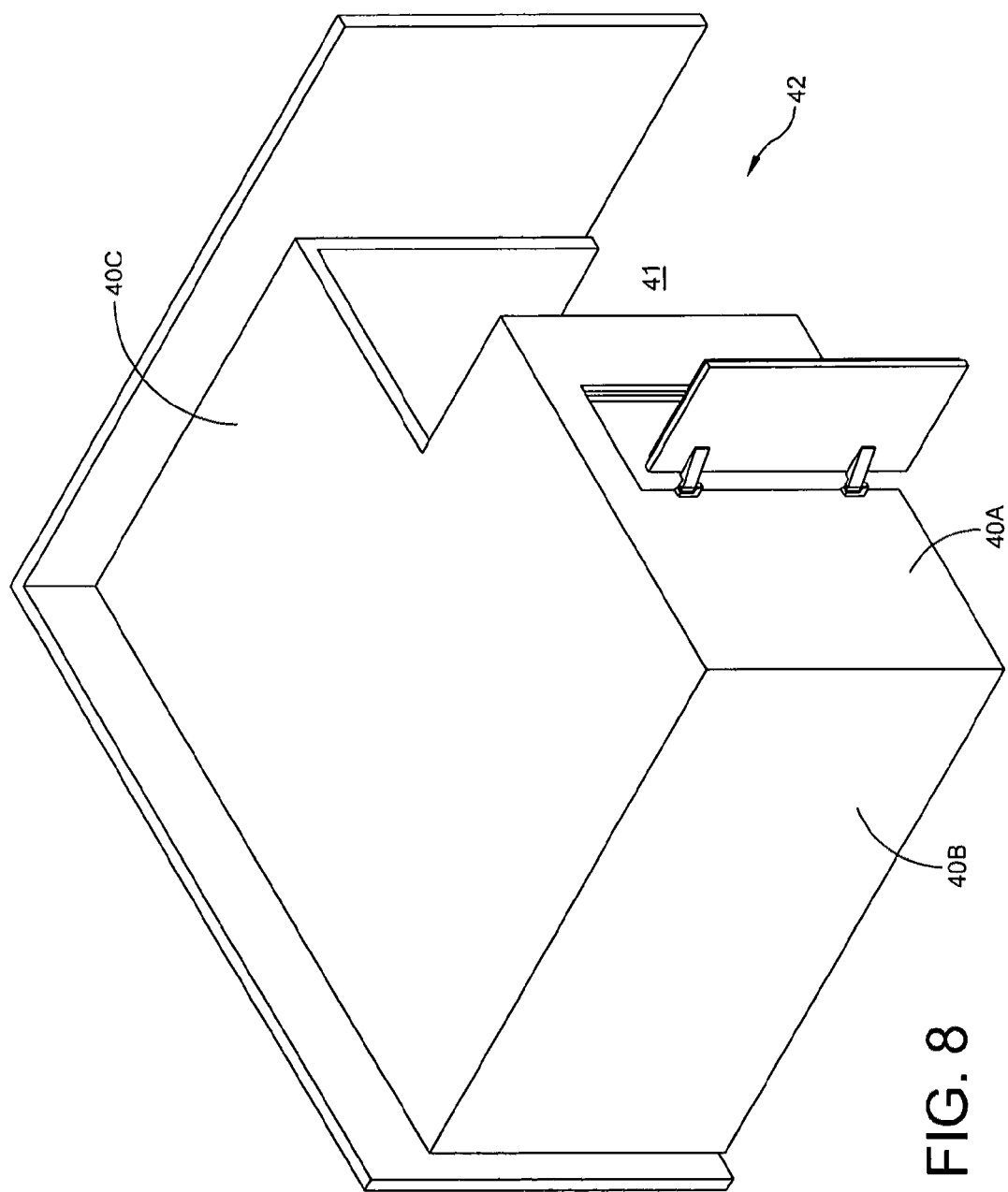
FIG. 8 illustrates the refrigerated room of FIG. 7 subsequent to panels being removed for the addition of a new Blast Chiller freezer enclosure.

FIGS. 7 and 8 illustrates a typical refrigeration room 40 that is typical of the type of room retrofitted with the Modular Chiller system of the present invention. First, a portion 42 of the existing refrigeration room 40 is removed to accommodate retrofit of the Modular Chiller system. In the preferred embodiment, an area of 20 square feet would accommodate a universal roll in rack 15 (see FIG. 12) capable of holding 20-30 food size pans, and approximately 220-330 lbs of food. To size the proper area of the room, a customer is first asked how many pounds of food is needed to be blast chilled (160F down to 40 F degrees) and/or shock freezed (160 F down to 0 F degrees).

Figure 16:
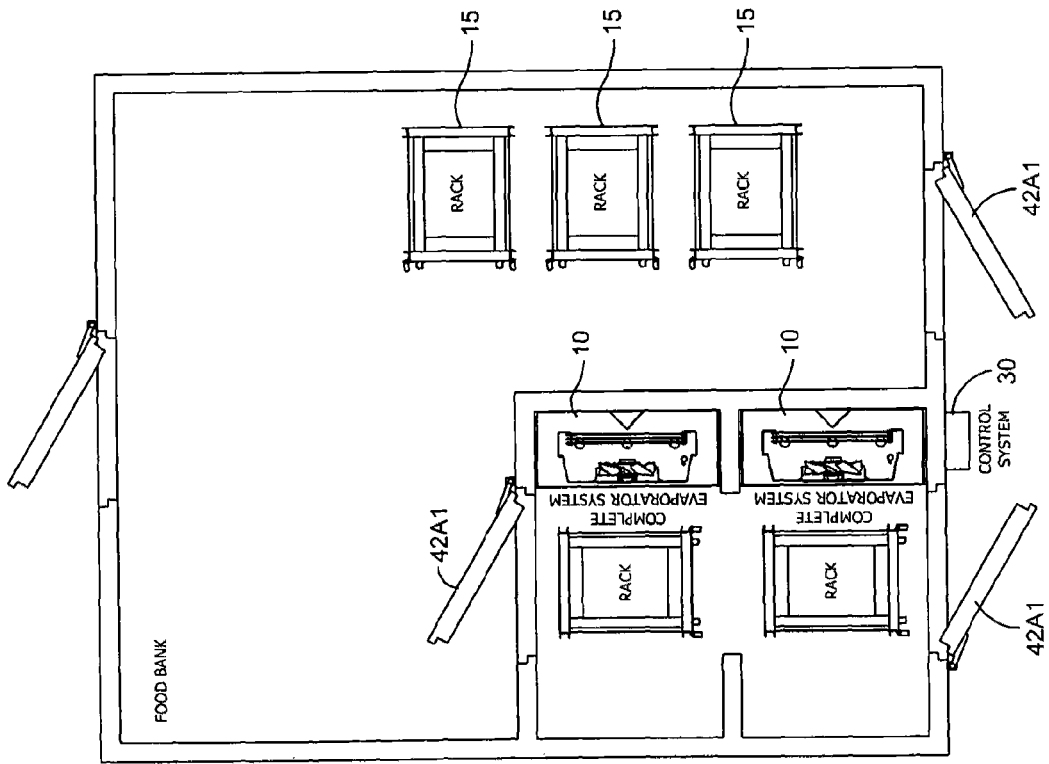
Figure 17:
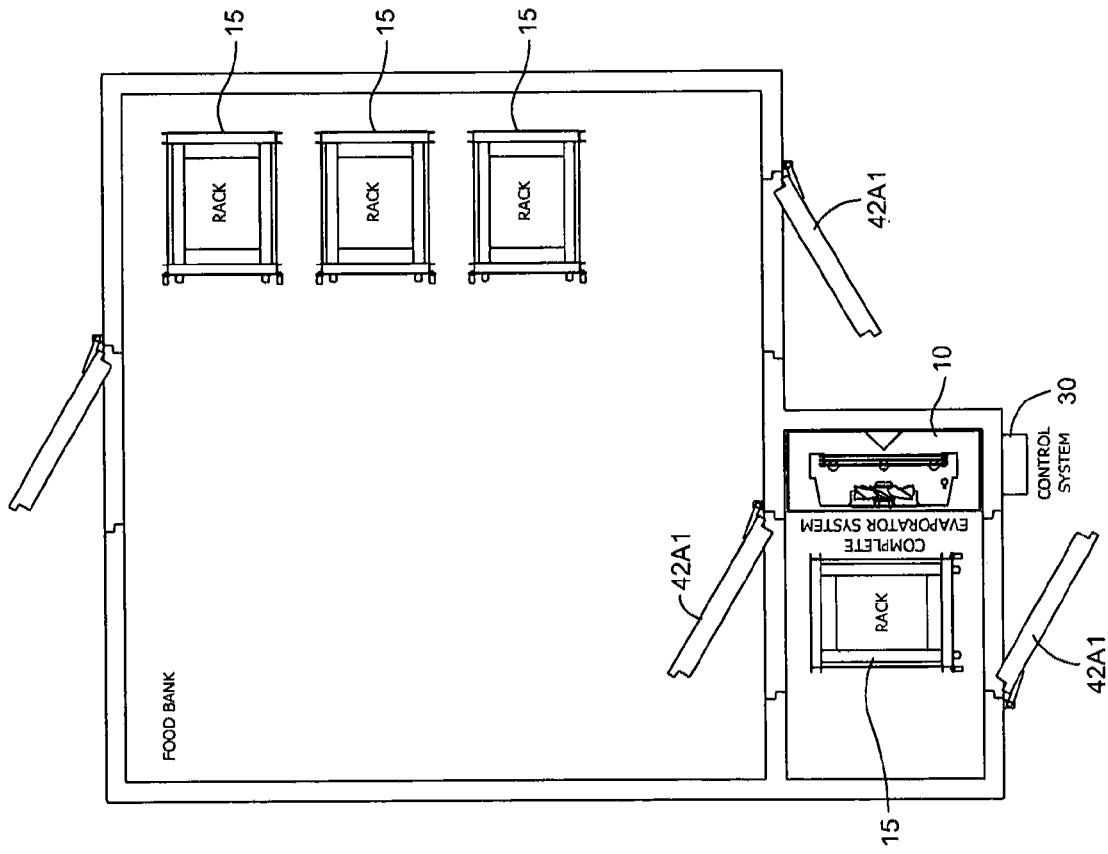
Figure 18:
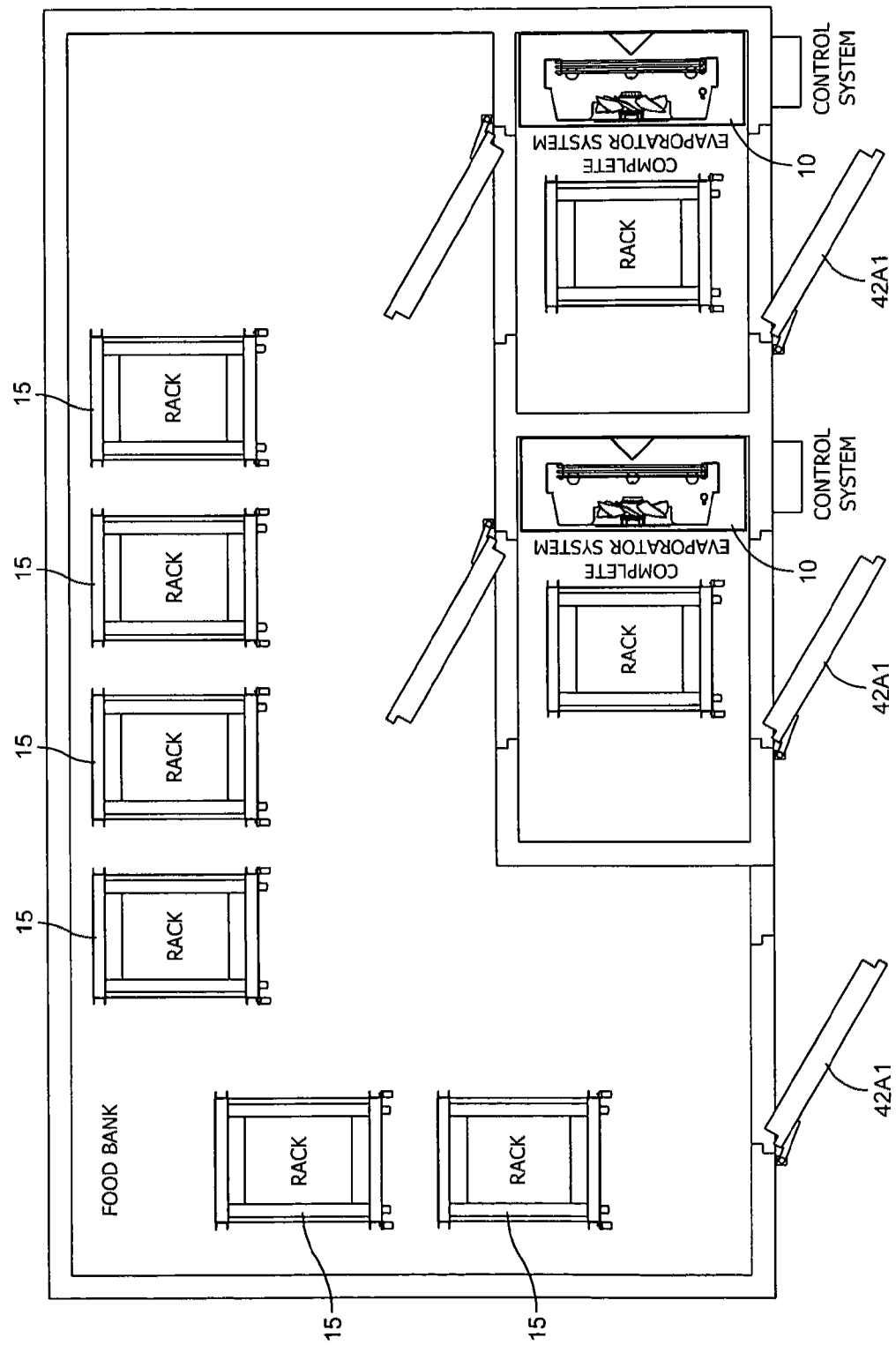

A ninety minute cycle, to process up to 264 lbs of food, would require a 20 sqft space for a single rack system. The 20 sqft space would require a universal rack 15 which would hold up to 26 food pans. A minimum 30 inch door would be required for entry and exit of the food rack 15. In the preferred embodiment, single rack spaces are partitioned in 20 sqft increments. As illustrated in FIG. 16, side by side spaces are broken out as 20 sqft spaces, each having a rack 15 capable of holding up to 440 lbs of food.

A single rack 15, in a 20 sqft space, holding up to 264 lbs of food would require an evaporator size of approximately 26,000 BTU/Hr at 15 F evaporator temperature and 110F condensing temperature, to achieve the aforementioned blast chill/shock freeze requirements. A single rack 15, in a 20 sqft space, holding up to 440 lbs of food would require an evaporator size of approximately 44,000 BTU/Hr at 15 F evaporator temperature and 110F condensing temperature, to achieve the aforementioned blast chill/shock freeze requirements.

The Modular Chiller Assembly 10 components (evaporator, fans, defrost heaters, EXP valve, liquid line solenoid valve, etc) and condenser unit can be determined for the size space, quantity of food and required chill/freeze times by means known in the art. Examples illustrated are preferred, for the chill/freeze requirements set forth in the preferred embodiments of subject invention, however, chill/freeze requirements and evaporator/condenser sizes can be determined for any size space by means known in the art.

The panels are cut or removed by means known in the art, and new insulation panels are installed. Manufacturers, such as BARR, Inc provide panels for refrigeration systems that can be provided at custom sizes with all necessary hardware for installation.

Figure 9:
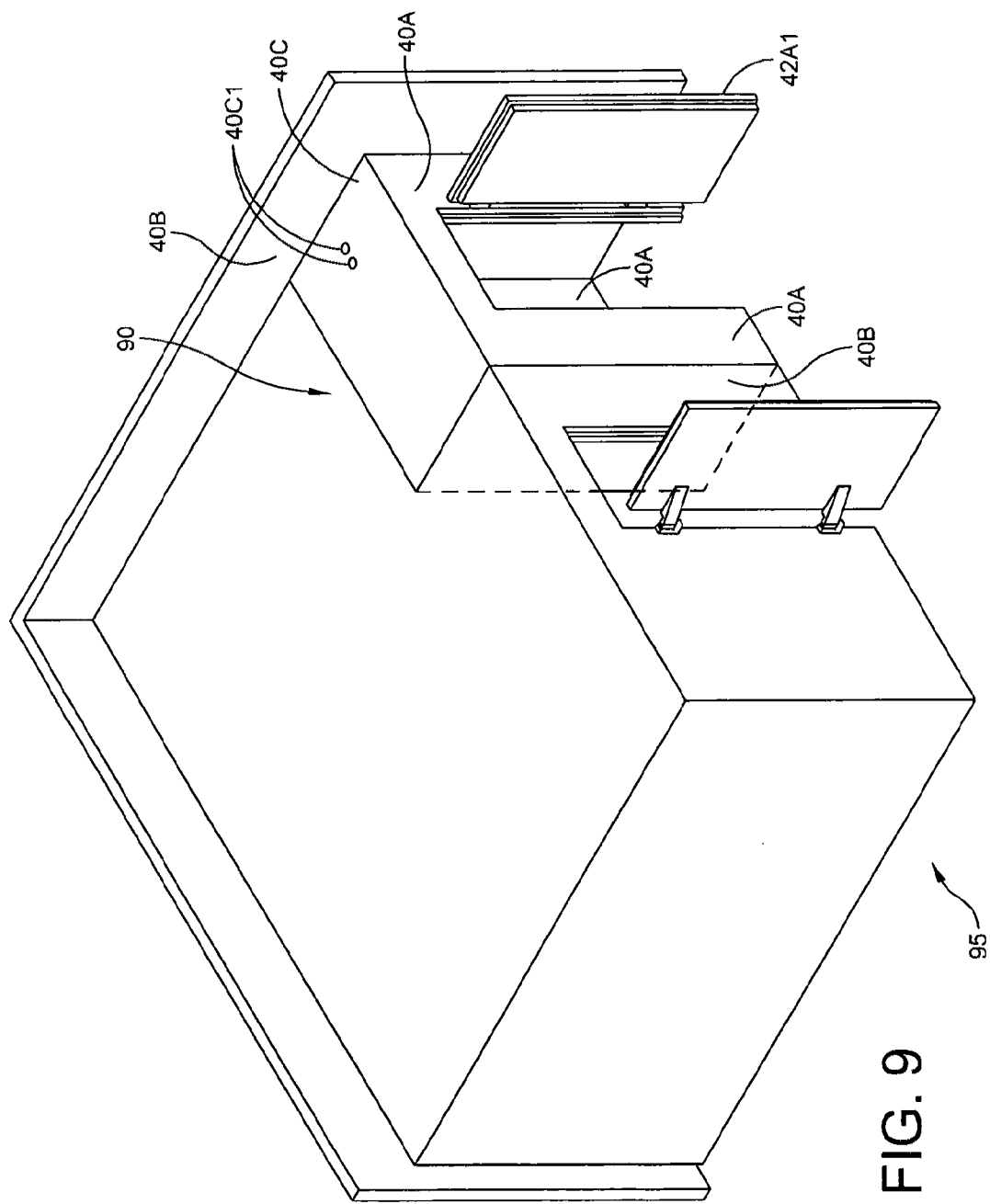
FIG. 9 illustrates the newly installed panels and doors creating a new Blast Chiller freezer enclosure in the larger refrigerated room.
Figure 15:
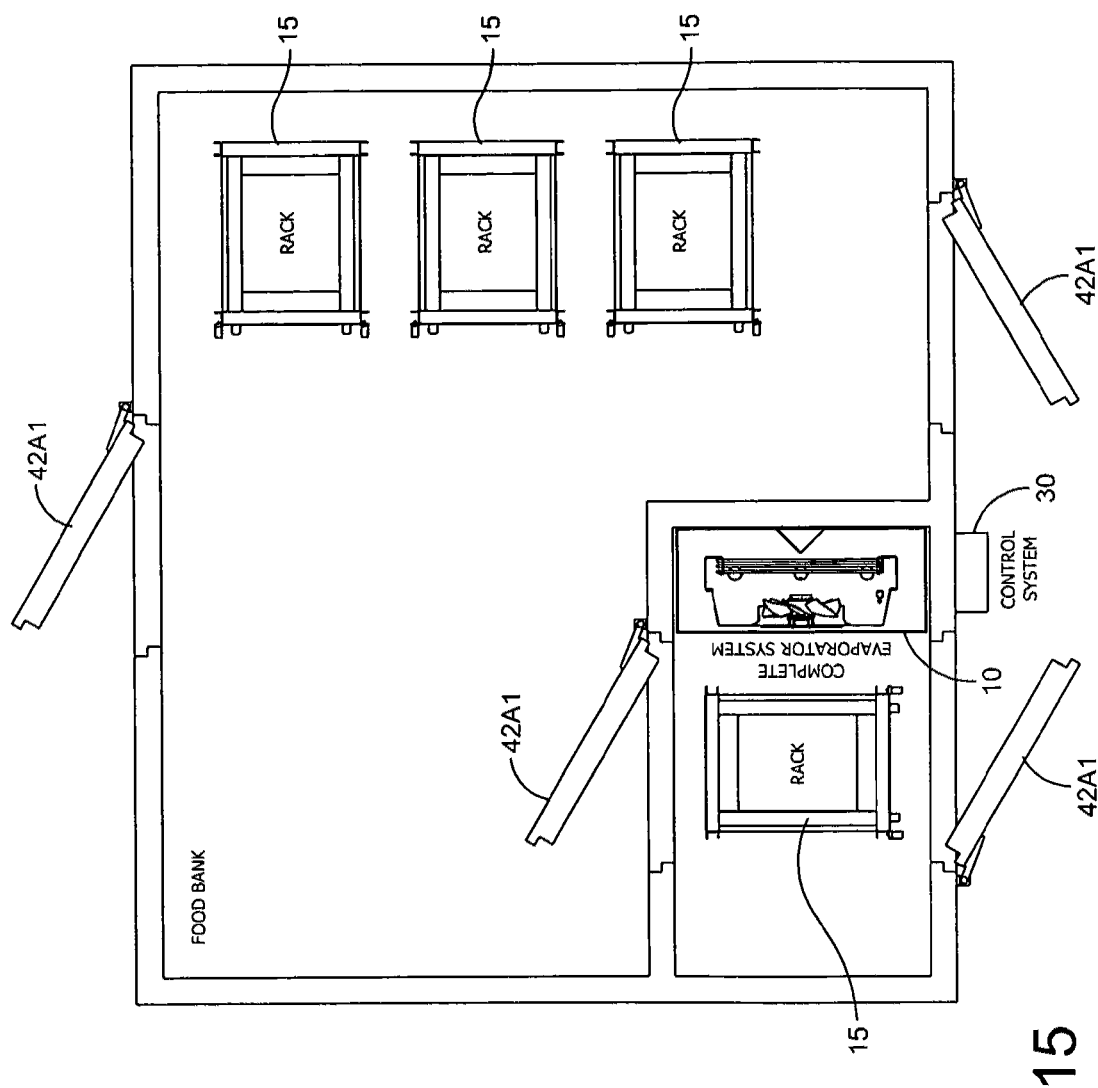
FIG. 15-18 illustrates multiple embodiments of the present invention retrofitted into larger refrigerated rooms.

As illustrated in FIG. 9, new front panels 40A (end walls), side panels 40B (side-walls), and top panel 40C (ceiling) create a smaller blast chiller freezer enclosure 90 within the larger refrigeration enclosure 95, situated on floor 41. To complete the new smaller blast chiller freezer enclosure 90 a door 42A1 or multiple doors 42A1 may be installed as illustrated in FIG. 9 and FIG. 15. Top panel 40C includes openings 40C1 for refrigeration lines 20M and electrical lines 20N.

Figure 10:
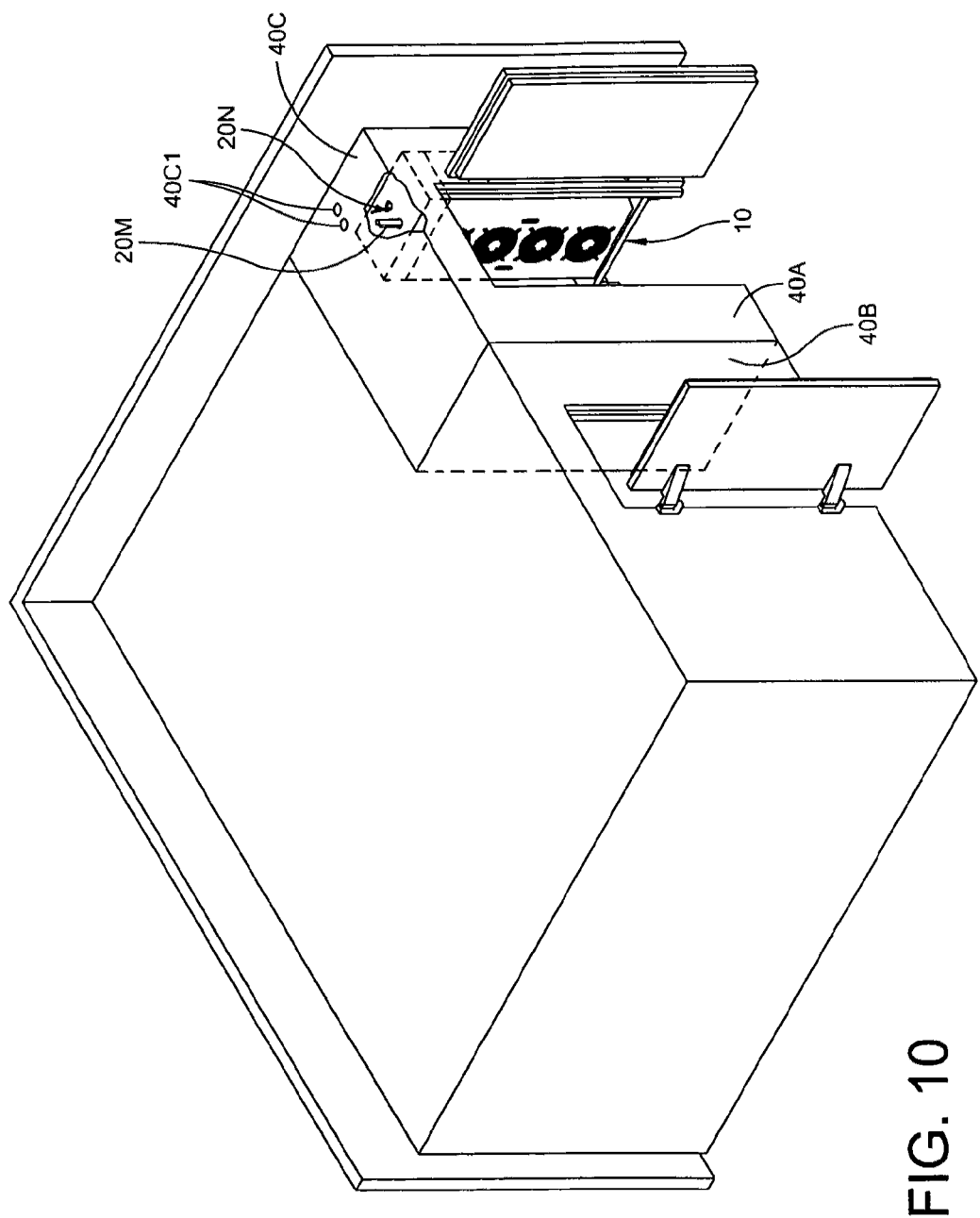
FIG. 10 illustrates the Modular Chiller frame assembly of FIG. 1 installed in the new Blast Chiller freezer enclosure of FIG. 9.
Figure 11:
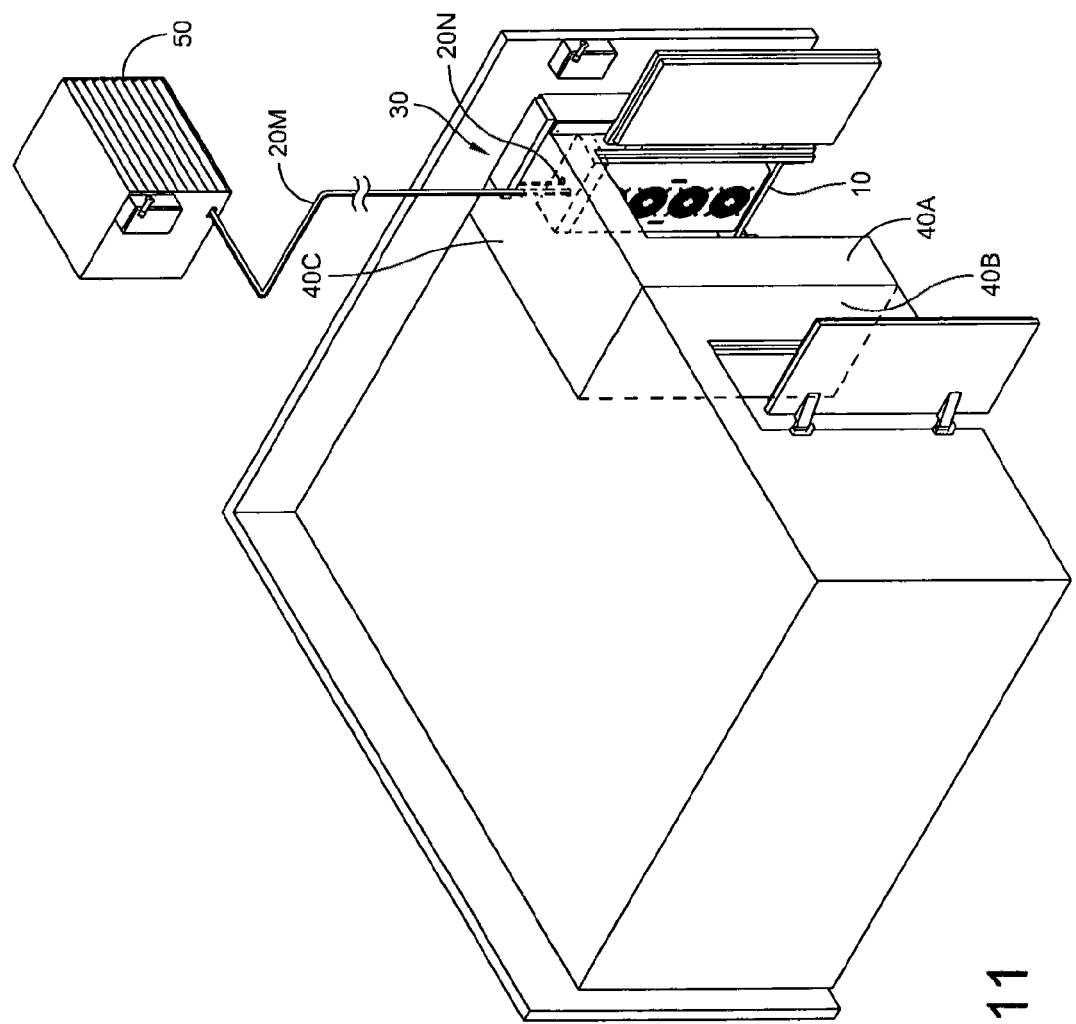
FIG. 11 illustrates the addition of the Control Panel and outside condenser unit to the Blast Chiller freezer enclosure of FIG. 10.

Next a location is chosen for the placement of Modular Chiller frame assembly 10 within enclosure 90. Although frame assembly 10 can be placed against any interior wall 40B or 40A, placement against sidewall 40B on the side of larger frame 95 sidewall 40B is preferable for shorter runs of electrical and refrigeration lines, as indicated in FIGS. 10 and 11. As illustrated in FIGS. 10 and 11, refrigeration lines 20M and electrical lines 20N are routed through openings 40C1 for interface to remote condenser unit 50 and Controller unit 30.

Figure 4:
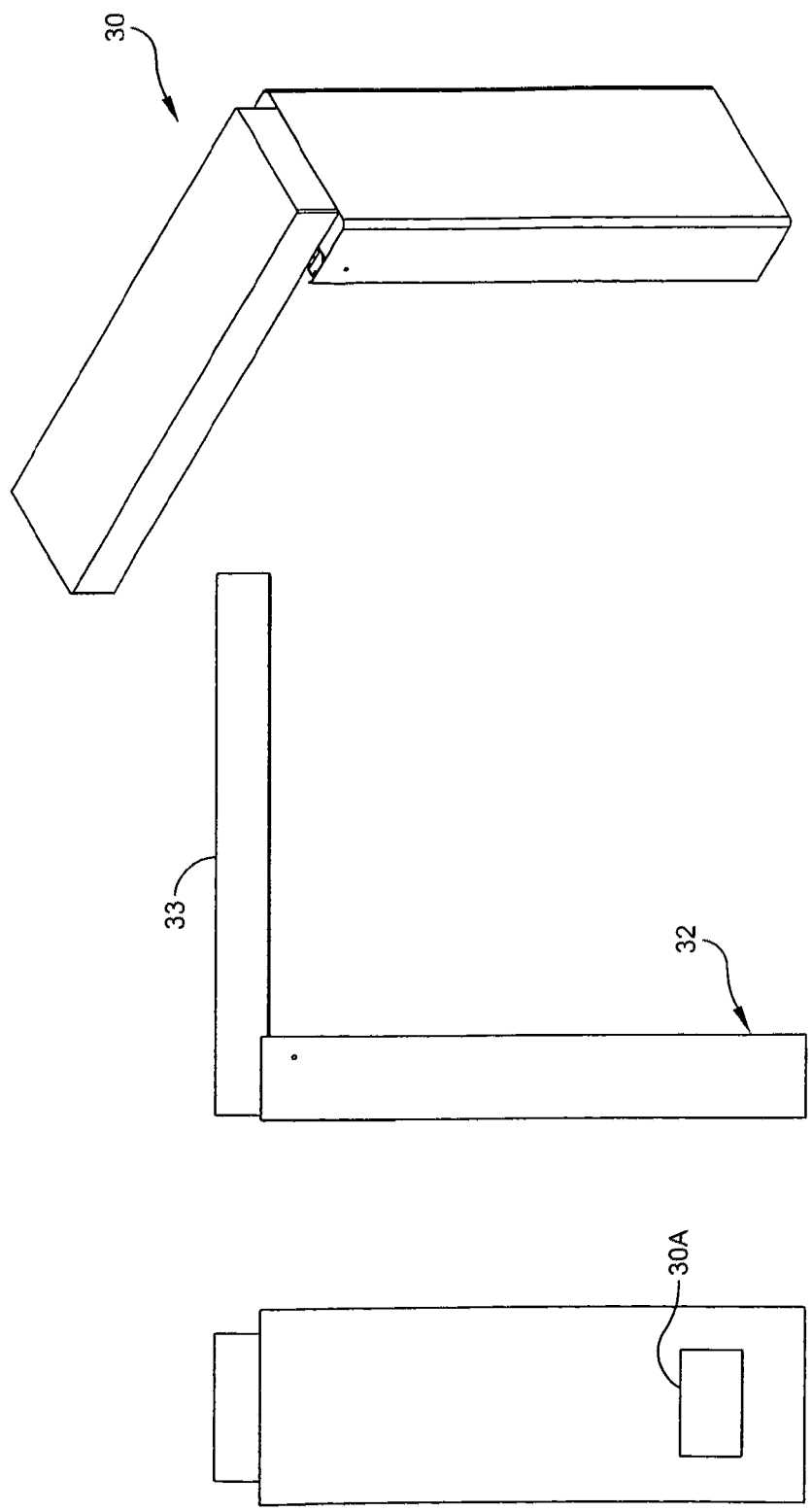
FIG. 4 illustrates the Control Panel of the present invention used in conjunction with the Modular Chiller frame assembly of FIG. 1 for retrofit to either an existing refrigerated room or integrated into a standalone blast chiller enclosure.
Figure 5:
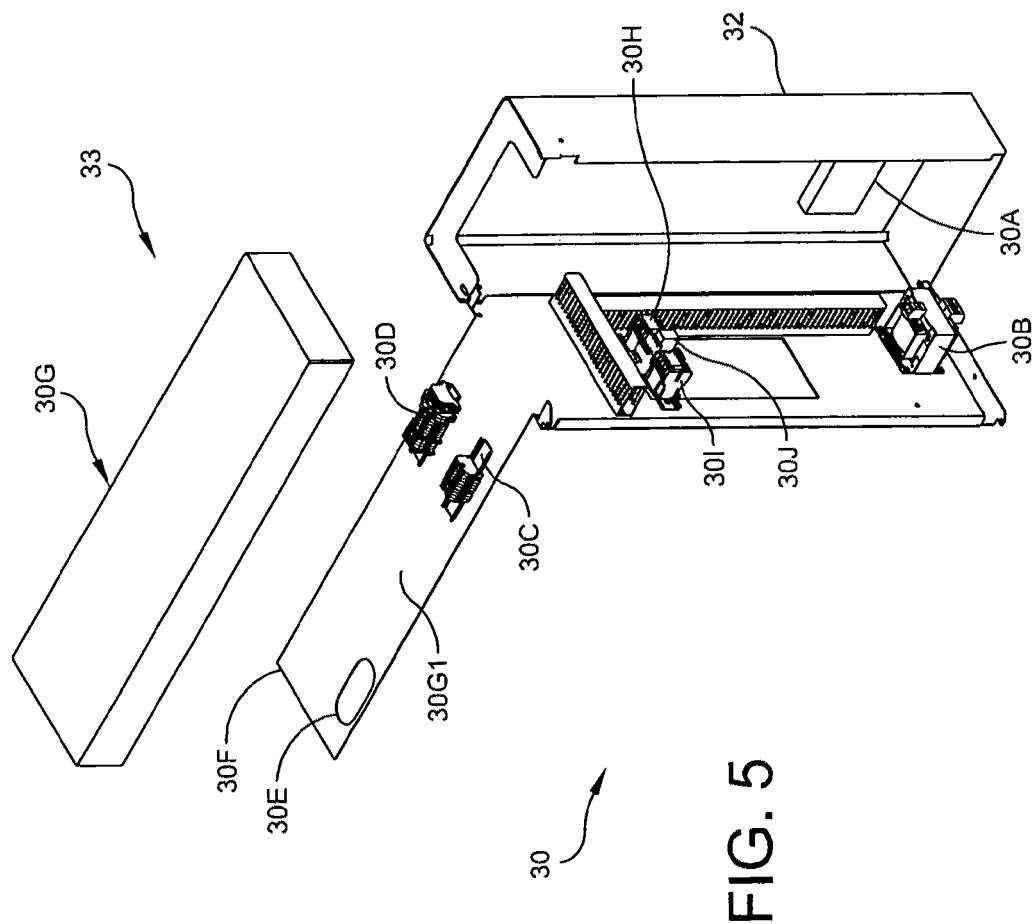
FIG. 5 illustrates an exploded view of the Control Panel of FIG. 4.

Control unit 30, in the preferred embodiment, as illustrated in FIG. 4 and FIG. 5, includes a top section 33 and a side section 32, the two sections being substantially perpendicular to each other. As illustrated in FIG. 11, in the preferred mounting location, top cover 30G, which includes electrical panel 30F (FIG. 5), is mounted on top panel 40C, with cable transition hole 30E approximately over cutouts 40C1 to allow a direct passage of electrical lines 20N through top panel 40C and through cable transition hole 30E.

Side section 32 of control unit 30 rests against sidewall 40A and includes an operator interface 30A. The location of control unit 30 allows for a clean installation and effectively covers the presence of electrical lines. Electrical lines routed through cable transition hole 30E are connected at terminal block 30C and power terminal block 30D. As illustrated in FIGS. 11 and 12, the intake provided by fans 20A is coextensive with the position of rack 15 placed in front of frame assembly 10.

Figure 6:
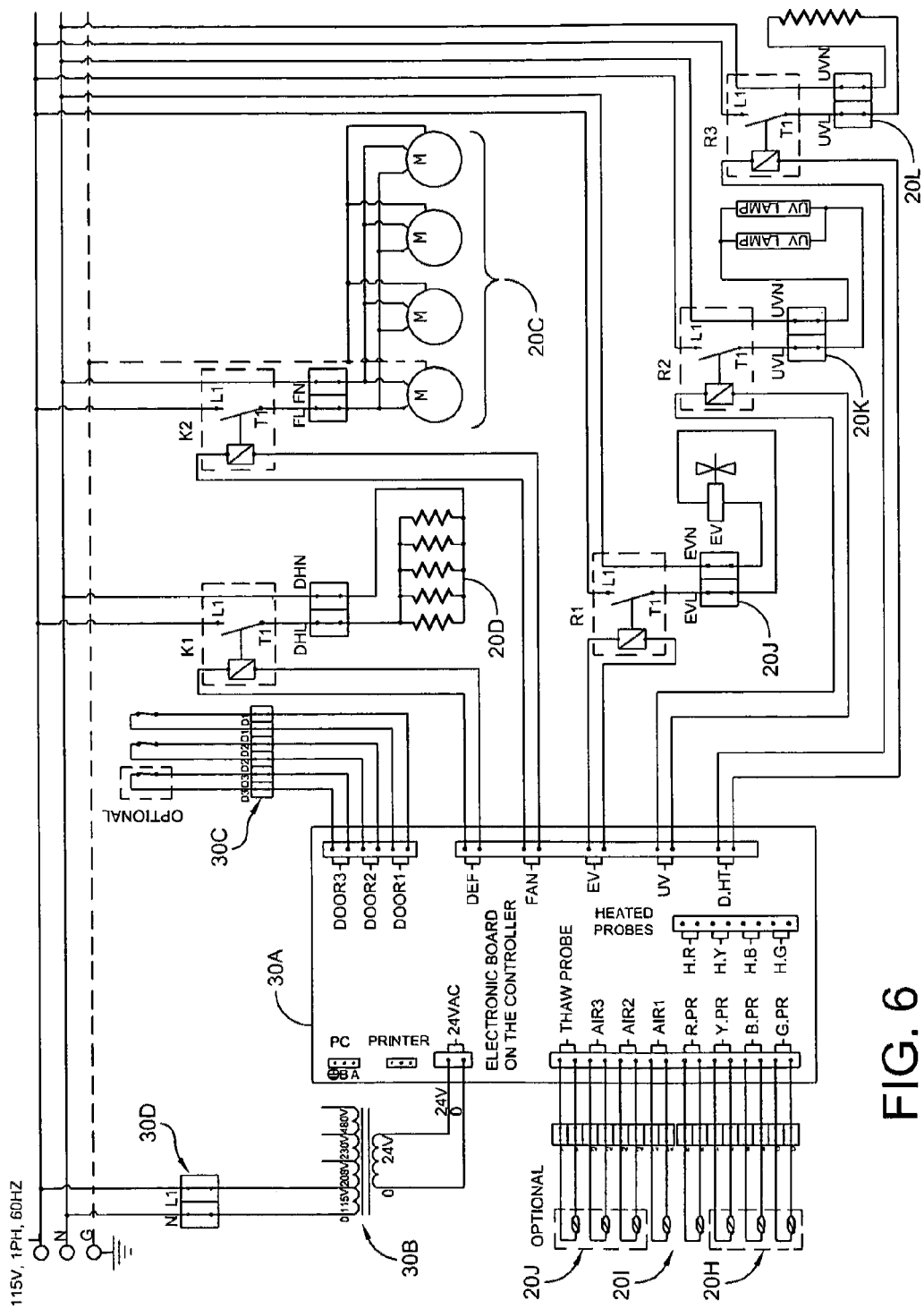
FIG. 6 illustrates the electrical schematic of the control panel of FIG. 5.

Referring to FIG. 6, operator interface and controller 30A includes a microprocessor based programmable computer for controlling the operation of chiller system components 25, to accomplish the rapid freezing of food product. Operator interface and controller 30A may include an industrial grade VFD (Vacuum Fluorescent Display) which allows the operator to view it from any angle. On screen programming via controller 30A utilizes inputs from thaw probe(s) 20J, air probe(s) 20I, and food probe(s) 20H, that sense temperature and provide inputs to the controller.

Food probes may include heated tips, activated by the controller to allow for easy extraction of probes 20H from frozen food. The controller may further have inputs from switches located on the blast chiller freezer enclosure doors 42A1 and evaporator doors 20B. The controller 30A can be programmed to start or stop the chiller system based on inputs indicating that the doors are opened or closed. Blast Chiller freezer enclosure 90 (FIG. 9) can also include Ultra Violet lights for killing bacteria on the inside of the enclosure, programmable by the controller 30A.

The controller has inputs for various signals to generate alarms for conditions such as air temperature high or low, food to hot, and power failures. The controller further includes inputs for connection to external devices such as printers and computers for downloading and printing data.

The chiller system components 25 operate whereby the input of a target temperature will control the chiller system components to freeze the contents of rack 15 within the specified time period. The controller 30A is capable of storing hundreds of recipe freeze temperatures, and is programmable for rapid temperature pull down cycles, at intervals of (1, 2, 5, 10 . . . ) minutes, including start/stop cycle times.

The controller 30A can operate in either the manual or automatic mode. In the manual mode, the operator selects either a soft chill cycle, hard chill cycle, shock freeze cycle, or thaw cycle. In manual mode, temperature inputs are via air probes 20I. The manual soft chill cycle will maintain the air temperature in chiller freezer enclosure 90 between 32 F and 35 F for approximately 90 minutes. After 90 minutes the controller goes into holding mode, maintaining the freezer enclosure 90 temperature at 38 F to 40 F.

The manual hard chill cycle will maintain the air temperature in chiller freezer enclosure 90 between 0 F and 10 F for approximately 60 minutes. After 60 minutes the controller maintains the freezer enclosure 90 temperature at 32 to 35 F for another 60 minutes during the second part of the cycle. After the second cycle is complete the controller goes into holding mode maintaining the temperature at 38 F to 40 F.

The manual shock freeze cycle will maintain the chiller freezer enclosure 90 temperature at −25 F for 240 minutes, then will hold the temperature at 0 F. The manual thaw cycle is set for six hours and maintains the chiller freezer enclosure 90 at 40 F to 50 F in order to thaw a product from 0 F to 36 F. At the end of the six hours the controller goes into holding mode maintaining the air cavity at 38 F to 40 F.

In the automatic mode, the operator selects either a soft chill cycle, hard chill cycle, shock freeze cycle, or thaw cycle. In automatic mode, temperature inputs are via air probes 20I and food probes 20H. In the automatic soft chill cycle food probes 20H are inserted into a hot product and the temperature of freezer enclosure 90 will be lowered to 32 F to 35 F, utilizing temperature inputs from air probes 20I. When input from food probe is 40 F the controller goes into holding mode maintaining freezer enclosure 90 at 38 F to 40 F.

In automatic hard chill mode food probes 20H are inserted into a hot product and the temperature of freezer enclosure 90 will be lowered to 0 F to 10 F, utilizing temperature inputs from air probes 20I. When food probe 20H indicates a temperature of 55 F, at the center of the product, the controller 30A moves the temperature in freezer enclosure 90 to 32 F to 35 F. Next, when food probe 20H indicates a temperature of 40 F at the center of the product, controller 30A readjusts the temperature within freezer enclosure 90 to 38 to 40 F.

In the automatic shock freeze mode, the temperature of freezer enclosure 90 will be lowered to −25 F, utilizing temperature inputs from air probes 20I. When food probe 20H indicates a temperature of 0 F at the center of the product, controller 30A readjusts the temperature within freezer enclosure 90 to 0 F.

In the automatic thaw cycle mode, a thaw probe 20J is inserted into a frozen product via a hole drilled into the product. Controller 30A maintains the freezer enclosure 90 at 45 F, utilizing temperature inputs from air probes 20I, until thaw probe 20J reads a temperature of 36 F. At that point controller 30A will maintain the temperature in the freezer enclosure 90 at 38 F to 40 F.

It should be understood that the preceding is merely a detailed description of one embodiment of this invention and that numerous changes to the disclosed embodiment can be made in accordance with the disclosure herein without departing from the spirit or scope of the invention. Rather, the scope of the invention is to be determined only by the appended claims and their equivalents.

I claim:

1. A modular chiller system for chilling food within a food rack positioned forward of said chiller, the food rack having a plurality of shelves, a front, a back, and two sides, the modular chiller system comprising:
   a frame assembly including a plurality of air intakes, a heat exchanger, and an air deflector mounted therein;
   said plurality of air intakes coextensive with said plurality of shelves of said food rack, each of said air intakes drawing heat evenly across each of said plurality of shelves through said frame assembly and into said heat exchanger,
   said heat exchanger positioned rearward and coextensive with said plurality of said air intakes, said heat exchanger for evenly chilling said evenly drawn heat from said plurality of air intakes, and
   said air deflector positioned rearward and coextensive with said heat exchanger, said air deflector splitting said chilled air that has passed through said heat exchanger evenly across said two sides of said food rack, said split air directed to said front of said rack and drawn into said plurality of air intakes.

2. A modular chiller system as in claim 1, wherein said frame assembly further comprises a base panel, a top panel, and side supports extending there between, said plurality of air intakes and said heat exchanger fixed between said side supports.

3. A modular chiller system as in claim 2, wherein said base panel further includes legs to raise said frame assembly from the mounting surface.

4. A modular chiller system as in claim 2, wherein said base panel surface area and said top panel surface area extends beyond the periphery of said side supports.

5. A modular chiller system as in claim 4, wherein said air deflector splits said chilled air from said heat exchanger over said surface area of said base panel and said top panel.

6. A modular chiller system as in claim 1, wherein said air deflector includes a first section, a second section, and a center section, said first and second sections displaced away from said heat exchanger, said first and second sections terminating into a center section, said center section angled inward into said heat exchanger, said inward angled center section channeling chilled air from said heat exchanger over said first and second sections.

7. A modular chiller system as in claim 1, further comprising a condensing unit external to said frame assembly and connected to said heat exchanger.

8. A modular chiller system as in claim 1, wherein said plurality of air intakes, said heat exchanger, and said air deflector are positioned vertically within said frame assembly.

9. A modular chiller system as in claim 1, further comprising a temperature adjustment means, said temperature adjustment means for comparing a measured product temperature with a target product temperature and controlling said heat exchanger to lower said product temperature to said target temperature, said temperature adjustment means having a sensor capable of insertion into a product to be cooled, said sensor measuring a product temperature.

10. A modular chiller system as in claim 9, wherein said temperature adjustment means is contained in a control unit, said control unit having a top section and a side section, said top section and said side section being substantially perpendicular, said side section including said temperature adjustment means and operator interface for operation of said chiller system.

11. A modular chiller freezer enclosure including a modular chiller system for chilling food within a food rack positioned forward of said modular chiller system, the food rack having a plurality of shelves, a front, a back, and two sides, the modular chiller freezer enclosure, comprising:
   an enclosure for freezing non-frozen food product and for storing frozen food product, the room including a floor, a ceiling, opposing first and second end walls and opposing first and second side walls;
   a modular chiller system positioned within said enclosure, said modular chiller system comprising:
      a frame assembly including a plurality of air intakes, a heat exchanger, and an air deflector mounted therein;
      said plurality of air intakes coextensive with said plurality of shelves of said food rack, each of said air intakes drawing heat evenly across each of said plurality of shelves through said frame assembly and into said heat exchanger,
      said heat exchanger positioned rearward and coextensive with said plurality of said air intakes, said heat exchanger for evenly chilling said evenly drawn heat from said plurality of air intakes, and
      said air deflector positioned rearward and coextensive with said heat exchanger, said air deflector splitting said chilled air that has passed through said heat exchanger evenly across said two sides of said food rack, said split air directed to said front of said rack and drawn into said plurality of air intakes.

12. A modular chiller freezer enclosure as in claim 11, further including a temperature adjustment means, said temperature adjustment means for comparing a measured product temperature with a target product temperature and controlling said heat exchanger to lower said product temperature to said target temperature, said temperature adjustment means comprising a sensor, said sensor measuring a product temperature.

13. A modular chiller freezer enclosure as in claim 12, wherein said temperature adjustment means is contained in a control unit, said control unit having a top section and a side section, said top section and said side section being substantially perpendicular and electrically interfaced, said side section including said temperature adjustment means and operator interface for operation of said chiller system.

14. A modular chiller freezer enclosure as in claim 13, wherein said top section of said control unit and said side section of said control unit are positioned outside of said enclosed room.

15. A modular chiller freezer enclosure as in claim 14, wherein said outside positioned control unit top section rests against said ceiling of said enclosed room and said outside positioned side section of said control unit rests against a wall selected from the group consisting of opposing first and second end walls and opposing first and second side walls.

* * * * *